July 5, 1932.  M. P. GRAHAM  1,866,098
TIE ROD END
Filed April 9, 1928
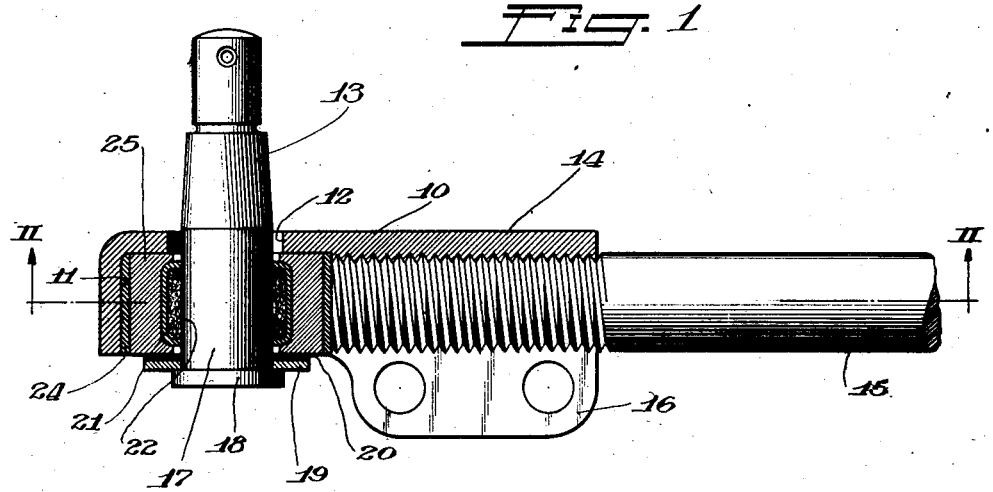
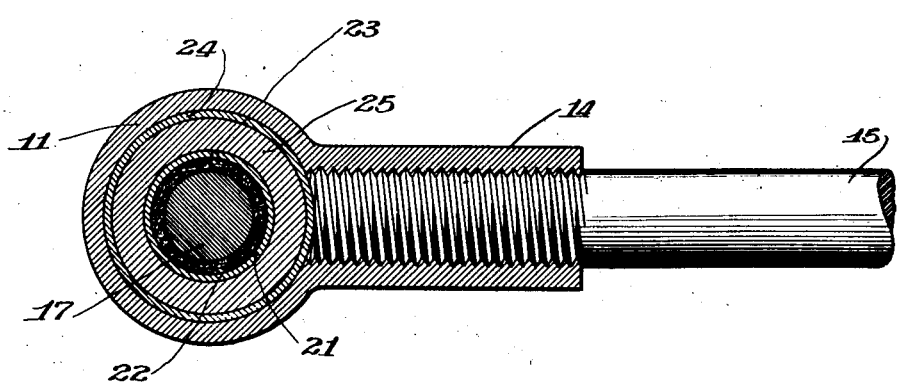
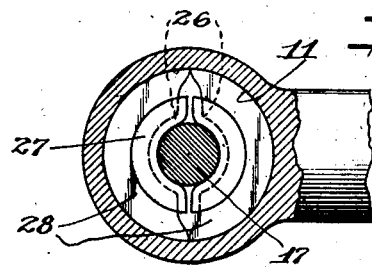
Inventor:
Matthew P. Graham
by:

Patented July 5, 1932

1,866,098

UNITED STATES PATENT OFFICE

MATTHEW P. GRAHAM, OF DETROIT, MICHIGAN, ASSIGNOR TO THOMPSON PRODUCTS, INC., OF CLEVELAND, OHIO, A CORPORATION OF OHIO

TIE ROD END

Application filed April 9, 1928. Serial No. 268,433.

This invention relates to tie rod connections for the steering mechanism of automotive vehicles, and has as an object the provision of a flexible joint equivalent in action to the well known ball joint connections which provide a pivot bearing having a limited universal movement to care for variations in alignment.

It is an important object of this invention to provide a tie rod socket or joint that can be manufactured at much less cost than a ball joint, and that will be trouble proof, self-lubricating, self-adjusting for wear, shock absorbing to eliminate pounding, and safe from accidental separation.

In order to accomplish these results, I provide a stud or pin having a cylindrical bearing surface and a housing therefor suspended therefrom with a resilient member, such as a rubber ring, disposed within said housing under heavy radial compression to take up wear between the cylindrical bearing surface of the stud and bearing members cooperating therewith. The resilient member under radial compression causes sufficient friction resisting relative rotation of the stud and housing on the tie rod end to prevent too great freedom of turning movement yet without making it difficult to steer. The resilient member also permits the required amount of angular movement between the cylindrical stud and the housing that is due to a non-parallel relationship of the king bolts or other causes.

It is a further important object of this invention to provide a split oilless bushing forming a bearing surface for the cylindrical portion of the stud and a rubber ring held under radial compression to compress the split bushing about the stud, whereby to permit relative angular movement between the stud and tie rod housing.

Other and further important objects of this invention will be apparent from the disclosures in the specification and the accompanying drawing.

This invention, in a preferred form, is illustrated in the drawing and hereinafter more fully described.

On the drawing:

Figure 1 is a longitudinal vertical sectional view through an assembled bearing socket embodying the features of this invention.

Figure 2 is a horizontal sectional view on the line II—II of Figure 1.

Figure 3 is a horizontal section thru a slightly modified form of this invention.

As shown on the drawing:

A housing or socket member 10 is formed with an inverted cup-like socket 11 to receive a stud and bearing assembly, a suitable aperture 12 being provided to allow the stem 13 of a stud or pin to project freely through the top closure of the socket. The member 10 is also provided with an internally threaded split extension 14 to receive the end of the tie rod intermediate section 15, the split extending into the socket 11 so that when the ears 16 of the split are drawn together by bolts both the tie rod 15 and the bearing assembly will be clamped in the member 10.

The stud or pin 13 is formed with a cylindrical bearing portion 17, with a bottom shoulder or collar 18, against which is positioned a metal washer 19. A felt washer 20 is positioned between the metal washer 19 and the bearing assembly to prevent chafing thereof.

The bearing proper comprises an oilless bushing which may be made as an annular metal shell 21 having a compressed graphite lining 22, the bushing so formed having a longitudinal split 23 to permit it to close up on the bearing 17 as wear develops. The bushing is centrally assembled within a larger outer ring or sleeve 24, the outer surface of which is a close fit in the socket 11. An elastic grade of rubber 25 is positioned under lateral compression between the sleeve and bushing, the radial pressure thus produced on the bushing tending to close the same and thereby rendering the bearing self-adjusting. The rubber 25 may be initially formed separately as an annular ring having a sufficiently large outside diameter and/or a sufficiently small inside diameter of bore that when forcibly assembled a radial pressure is set up, as was hereinbefore mentioned. Where the rubber ring has a bore of such small diameter that when the split bushing is in place, the passage for the stud is of less diameter than that of the stud, the taper of the stud facilitates forcing the stud through the passage into assembled position. When so assembled, the stud expands the bore of the rubber ring locally of the bushing to compress the rubber ring and set up radial forces urging the split bushing into closer contact with the cylindrical bearing surface of the stud.

The modified form of Figure 3 utilizes a pair of semicircular bushing shells 26 having flanged ends 27 partly enveloping the inner portion of the ends of semicircular rubber segments 28 which are forced directly into the housing 11 without the use of an enveloping sleeve 24. This form of the invention also eliminates the felt and metal washers 20 and 19, as the flanges 27 on the ends of the split bushings serve the same purpose. The split or two-piece bushings 26 are equally self-adjusting for wear, due to the pre-compression of the rubber, and allow slightly greater angular displacement of the stud. Furthermore, the flanges on said bushings 26 prevent any possibility of the rubber coming into direct contact with the stud.

In the operation of the tie rod connection of my invention, the upper end of the stud or pin is bolted to a steering arm of the vehicle, with the tie rod and housing suspended from said stud, and, as so assembled, it is evident that the parts are safe against accidental separation. The shoulder or collar 18, it should be noted, is integral with or otherwise permanently and rigidly secured to the stud and the washer 19 is of greater diameter than the diameter of the aperture 12, so that it is physically impossible for the housing to drop off of the stud. The housing may, however, slide upwardly on the cylindrical bearing surface 17 of the stud to a limited extent. This freedom of axial movement of the housing along the stud minimizes the amount of relative angular movement required to compensate for a non-parallel relationship of the king bolts. The stud is free to rotate within the oilless bushing and due to the usual non-parallel relationship of the king bolts, the studs also have a rocking or angular movement relative to the tie rod, this angular movement being permitted by the resiliency of the rubber ring. The rubber ring also acts as an efficient shock absorber, and prevents pounding in the tie rod connections because of the radial pressure or compressing action of the rubber on the bushing.

It will thus be seen that I have produced a practical and long-lived tie rod end or connection that is much cheaper to manufacture than the conventional ball joints and has important advantages thereover in the provision of automatic adjustment for wear, simplicity with a corresponding freedom from trouble, shock absorbing ability and the use of a self-oiling bushing.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a tie rod end assembly, a housing providing a cylindrical socket having an apertured end wall, a split bushing within said socket, a rubber ring positioned within said socket and held under radial compression between said bushing and said socket side wall in non-rotative engagement therewith relative thereto, a cylindrical stud swivelly mounted in said bushing with one of its ends extending freely through said apertured end wall and a member secured on the other end of said stud of larger diameter than said aperture to prevent said housing from dropping off of said stud.

2. In a tie rod end assembly, a housing, a stud projecting therefrom at one end and having a cylindrical bearing surface, said stud being disposed within said housing, for swiveling and angular movement relative to said housing, means within said housing radially and resiliently pressed against said cylindrical bearing surface to take up wear, said housing being slidable longitudinally along said cylindrical bearing surface and retaining means on the lower end of said stud for supporting said housing thereon.

3. In a tie rod end assembly, a stud having a cylindrical bearing surface, a housing therefor supported from said stud and having an apertured end wall through which one end of said stud freely extends, a split bearing bushing anti-frictionally engaging said cylindrical bearing surface, a rubber member within said housing under radial compression urging said bearing bushing into contact with said bearing surface to take up wear and permitting relative angular movement between said stud and housing and a retaining member of larger diameter than the aperture of said housing end wall on the other end of said stud to secure said housing on said stud, said retaining member and end wall substantially overlying the ends of said rubber member to enclose the same.

4. In a tie rod end assembly including a stud having means for connection with a steering assembly and having a cylindrical bearing surface, and a housing therefor carried by said stud below said point of connection, means on said stud for retaining said housing thereon, a bearing member defining a contractible bore for the reception of the cylindrical portion of said stud and a resilient member within said housing and engaging said bearing member to cause said bearing member before the insertion of said stud to normally define a bore of lesser diameter than that of the cylindrical portion of said stud, whereby when said stud is forcibly assembled in said housing said resilient member exerts direct radial compression upon said bearing member to contract said bore and thereby compensate for wear.

5. In a tie rod end assembly including a stud having means for connection with a steering assembly and having a cylindrical bearing surface, and a housing therefor carried by said stud below said point of connection, means on said stud for retaining said housing thereon, a split bearing member defining a contractible bore for reception of the cylindrical portion of said stud and in antifrictional engagement therewith, and a rubber member within said housing in non-rotative engagement therewith and with said bearing member, said rubber member before said stud is inserted in said bearing member being of such size as to cause said bearing member to normally define a bore of lesser diameter than that of the cylindrical portion of said stud, whereby when said stud is forcibly assembled in said housing said rubber member exerts direct radial compression upon said split bearing member to contract said bore and thereby compensate for wear.

In testimony whereof I have hereunto subscribed my name at Chicago, Cook County, Illinois.

MATTHEW P. GRAHAM.